No. 891,992.  
H. HESS.  
METHOD OF FORMING CONICALLY SHAPED ENDS UPON ROLLERS AND OTHER OBJECTS.  
APPLICATION FILED JUNE 27, 1907.  
PATENTED JUNE 30, 1908.

Witnesses:

Inventor:  
HENRY HESS  
By his Attorney

UNITED STATES PATENT OFFICE.

HENRY HESS, OF WAWA, PENNSYLVANIA.

METHOD OF FORMING CONICALLY-SHAPED ENDS UPON ROLLERS AND OTHER OBJECTS.

No. 891,992.  Specification of Letters Patent.  Patented June 30, 1908.

Application filed June 27, 1907. Serial No. 381,138.

*To all whom it may concern:*

Be it known that I, HENRY HESS, a citizen of the United States, residing at Wawa, in the county of Delaware and State of Pennsylvania, have invented certain new and useful Improvements in the Method of Forming Conically-Shaped Ends upon Rollers and other Objects, of which the following is a specification, reference being had therein to the accompanying drawing.

My invention relates to a method of forming conically-shaped ends upon rollers and other objects, and is more particularly disclosed herein in connection with the formation of such crowns or apices upon the rollers used in the journal bearings illustrated in my application for Letters-Patent executed as of even date herewith. It will be obvious, however, that the method is capable of far broader application, and in fact may be employed to produce ends shaped as cones, or as the frusta of cones, upon any desired objects.

Referring to the form of rollers previously mentioned, it will be seen that in order to obtain the greatest accuracy and uniformity, and the least resistance and wear, it is essential that their conically-shaped ends shall be absolutely true and similar, and that the axial length of the rollers, namely from the apex of the crown to the center of the roller at the other end, shall be exactly the same in all. These results I secure by forming the crowns by the method now to be described.

Figure 1:
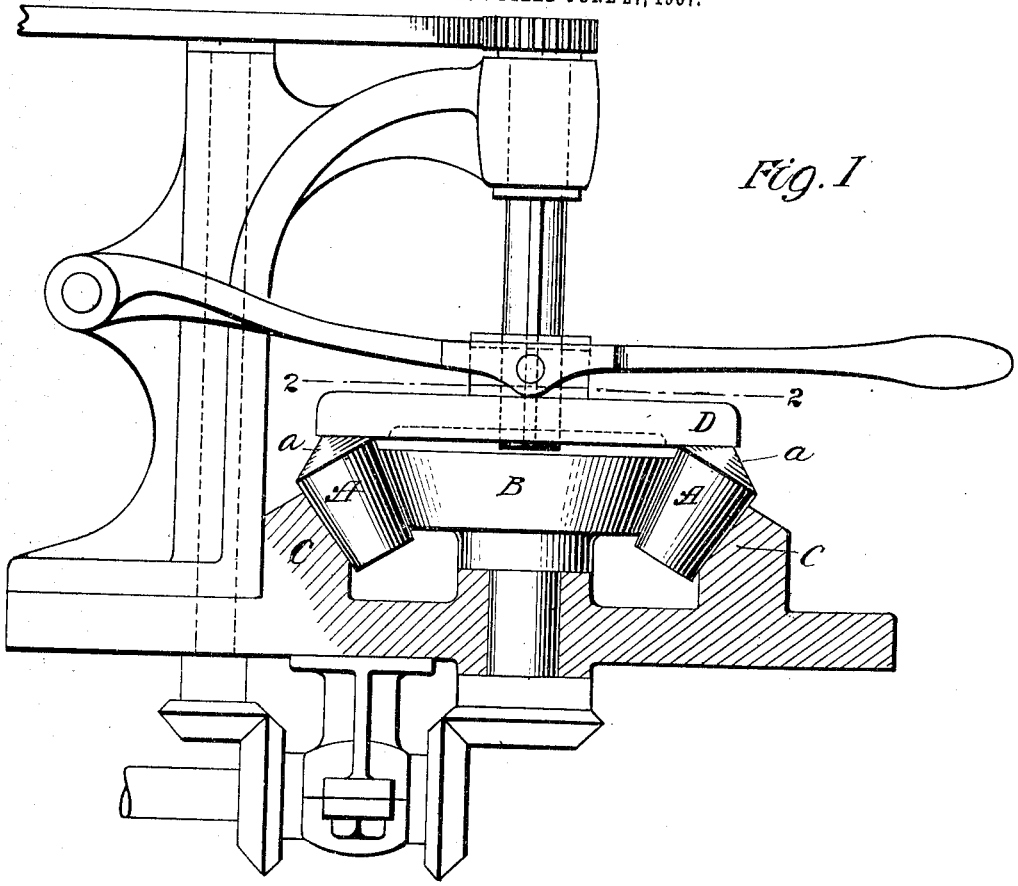
Figure 2:
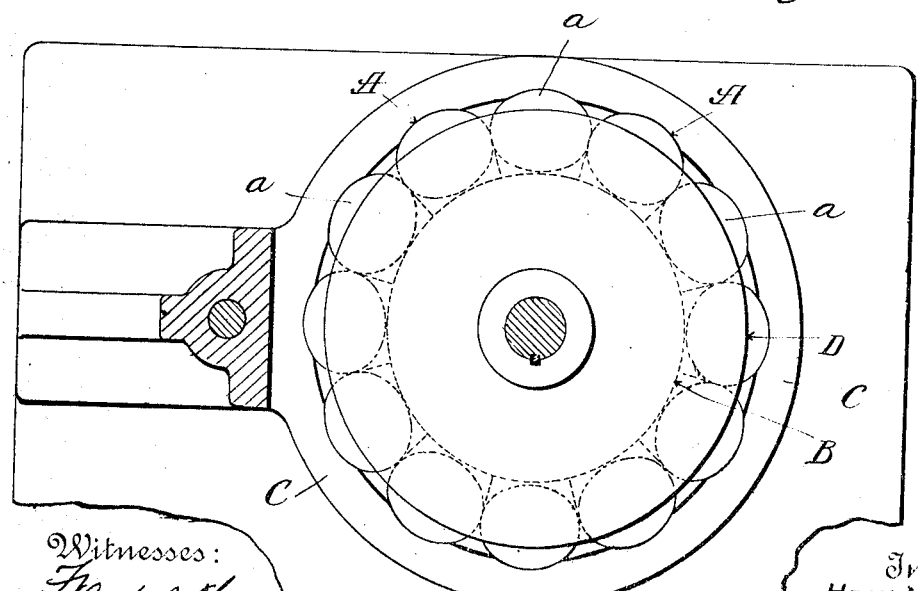

Referring to the drawing, Figure 1 is a perspective view, partly in section, of a portion of a machine designed to carry out my method, and Fig. 2 is a transverse sectional view thereof, taken substantially on the line 2—2 in Fig. 1.

As illustrated in the drawing, the rollers A—A are conically-shaped as to their general outline, as in my other case previously mentioned, and it is desired to form their crowns or ends a—a also as cones. The general conical conformation of the rollers A—A, is, however, not essential to the employment of my method, which is designed generically for the production of conical apices upon any objects where they may be desired.

The rollers A—A are mounted in series between a ring C and an internal rotatable disk B, the ring and disk being suitably shaped to correspond exactly to the rollers A—A, and by disposing the rollers in the manner indicated, they are brought into proper angular position to be subjected to the action of the grinding tool D.

The tool D may be rotated in any desired manner, such for instance as by the connections indicated in Fig. 1, so that it may exert its grinding action upon the rollers A—A, and devices may also be employed to insure the necessary and proper contact of the tool with the work.

The disk B is shown as provided with suitable gearing whereby it may be rotated, and thereby, because of its contact with the rollers A—A, the latter are also caused to rotate individually, so as to present successively and continuously all portions of their crowns a—a to the action of the tool D. As shown in the drawing, these rollers A—A are mounted in the machine in substantially the angular relation to each other that they occupy in the bearing, and it will be seen that by the employment of my method, absolute uniformity is secured as to the axial length of the rollers, and also the exact similarity of the conical ends formed thereon.

It will be obvious that my improved method may be employed in many different ways, either by machinery equivalent to that illustrated in the drawing, or by hand, without departing from the spirit of my invention. Thus, for instance, the rollers need not be arranged in the exact angular relation previously described, all that is essential in this respect being that the angular relation adopted should be the one calculated to give the desired pitch to the crowns. As previously pointed out, also, the main portion of the object operated upon need not be conical, as in the particular illustration given. Again, the internal disk B might remain stationary, and the external ring C be rotated to produce the same result, namely the individual rotation of the rollers or other work. Or again, both the external ring and the internal disk may be rotated, or other and entirely different means may be employed to secure the rotation of the work. Similarly, the particular means employed for forming the conical ends may be entirely different from that herein disclosed, and such means might consist of milling tools, wood-working tools, etc., etc., dependent upon the material employed and the nature of the result desired. These and many other variations will suggest themselves to those skilled in the art, and I regard them all as comprised within the scope of my invention, which in its broad terms, consists in the method of mounting a plurality of the objects to be operated upon in proper angular position, rotating them individually, and simultaneously applying the forming tool to the ends thereof, in order to produce conical crowns thereon.

Having thus described my invention both generically and specifically, what I claim and desire to secure by Letters-Patent of the United States is as follows:

1. The method of forming conically-shaped ends upon rollers, consisting of mounting a plurality of the rollers in circular series and in the desired angular position, rotating the rollers individually, and simultaneously applying the forming tool to all the ends thereof.

2. The method of forming conically-shaped ends upon rollers for journal bearings, consisting of mounting a plurality of rollers in the angular relation they occupy in the bearing, rotating the rollers individually, and applying the forming tool to the ends thereof while thus rotated.

In testimony whereof I have affixed my signature in presence of two witnesses.

HENRY HESS.

Witnesses:
  NETTIE L. HAHN,
  C. D. M'CALLA.